Sept. 14, 1965  A. F. LANDERS  3,205,966
ENGINE ELECTRIC DRIVE
Filed Nov. 28, 1962
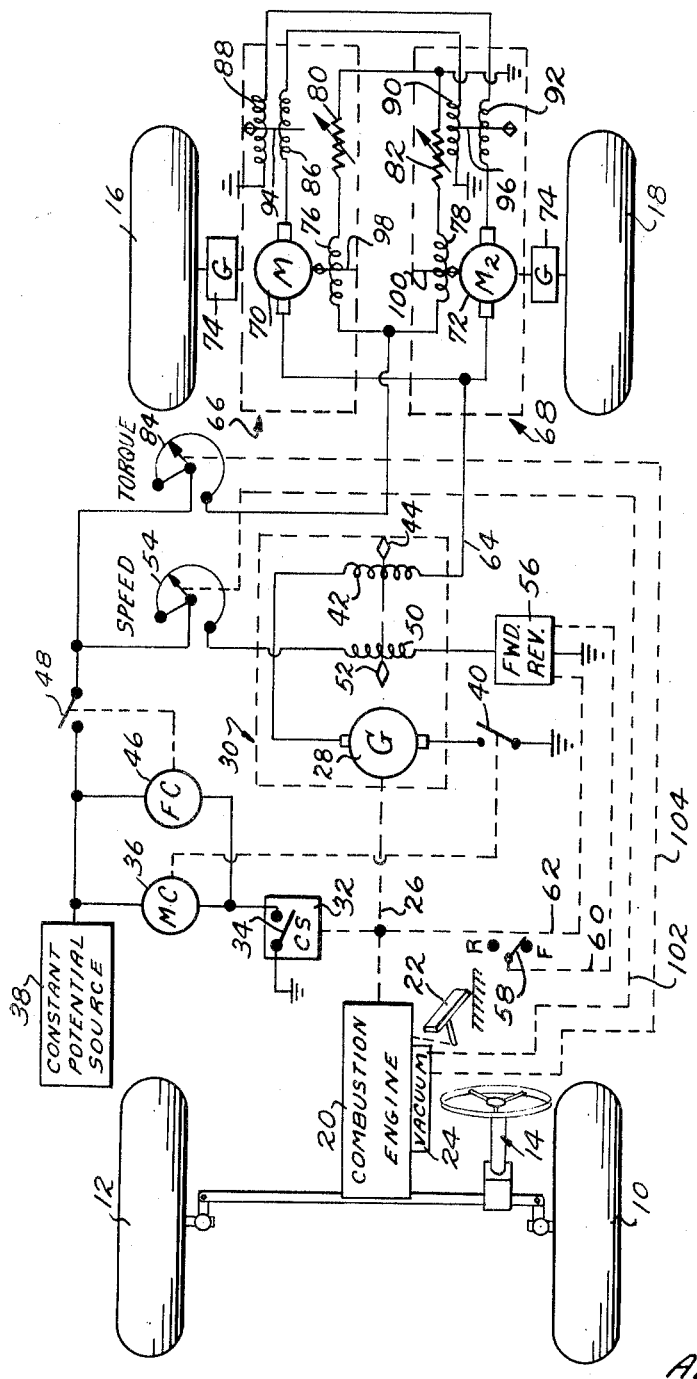
INVENTOR.
ALBERT F. LANDERS
BY
Cushman, Darby & Cushman
ATTORNEYS

United States Patent Office 3,205,966
Patented Sept. 14, 1965

3,205,966
ENGINE ELECTRIC DRIVE
Albert F. Landers, Pearlington, Miss., assignor to Engine Electric Drive, Inc., New Orleans, La., a corporation of Louisiana
Filed Nov. 28, 1962, Ser. No. 240,695
6 Claims. (Cl. 180—65)

This invention relates to a power drive system, and particularly to an engine electric drive.

It is one of the purposes and objects of this invention to provide an engine electric drive which when utilized in a vehicle for example, eliminates the conventional mechanical transmission and differential thereof, utilizing instead at least one D.C. generator and wheel drive motors with associated control. Manual or automatic control of the motor and generator fields is provided and due to the characteristics of the motors and generators, the control thereof is such that the engine operates at a speed in line with its maximum efficiency. The generator and motor field controls cause the speed torque characteristic of the system to be shifted to meet the load requirements placed upon the motors by the vehicle and the driven wheels surface contacts. At starting times, maximum torque is obtainable by regulation of the motor field, and the minimum generator output voltage corresponding to the engine speed is then applied to the motors to effect a full transmittal of horsepower to the wheels. On the other hand, at highest running speeds, the motor torque may be reduced by minimizing the motor field while the speed of the motors is maximized by increasing the generator field to maximum, allowing the engine speed to be reduced for the particular running speed in question. Regular speed changes of the vehicle during operation are made in a conventional manner, for example by a foot accelerator associated with the engine, and as above indicated the speed torque characteristics of the electrical drive system are controlled either automatically or manually, or preset, in respect to the load requirements and best engine efficiency. The vacuum system of an internal combustion engine, for example the manifold vacuum, may be utilized to effect automatic change of the generator and motor fields, since the amount of pressure of the vacuum varies with the engine load in a well known manner. Combustion efficiency of the engine may be determined by a conventional air-fuel ratio indicator.

On existing vehicles, the power drive system of this invention may be installed to assure greater efficiency, less engine wear, greater starting torque, and to eliminate a transmission clutch and differential. In new vehicles, the invention allows for a simplified carburetor and ignition systems, lower maintenance costs, and a lower engine horsepower than would be required for conventional engine nonelectric drives.

Other objects and advantages of this invention will become apparent to those of ordinary skill in the art after reading the appended claims and the following detailed description of the invention in conjunction with the attached drawing.

This invention may be utilized with passenger vehicles or trucks of any size desired. In the drawing, a road vehicle is diagrammatically represented by the illustration of two front wheels 10 and 12 to which are connected a steering wheel 14 and conventional turning system. Rear wheels 16 and 18 instead of being mechanically coupled to the combustion engine 20 by any one of the conventional transmission and differential systems (for example, a fluid type automatic transmission, drive shaft, and mechanical differential) are coupled thereto electrically as is described below.

In accordance with this invention, the operating speed of combustion engine 20 is determined by a conventional foot accelerator 22, and the combustion engine has the usual manifold vacuum 24. Engine speed is indicated by the rotational speed of the engine output shaft, which is diagrammatically represented by dash line 26.

Generally speaking, engine 20 may be referred to as a prime mover that has a given horsepower rating at a given related speed and provides a substantially constant horsepower output for any speed up to such given speed.

The output shaft 26 of the engine drives the armature 28 of differential generator 30 at a speed corresponding to the operating speed of the engine. Before the generator armature 28 will provide an output voltage or current however, the speed of engine 20 must exceed a predetermined speed such as is predetermined by a centrifugal switch 32 of the governor type for example, to cause its switch element 34 to close and connect the solenoid 36 of the main contactor MC across a constant potential source 38. When the solenoid is so energized, its associated switch 40 in the generator armature circuit closes to allow development of a current through the series field winding 42, which in turn develops a series field having a direction for example as indicated by the diamond tipped arrow 44.

Also connected to be energized upon closure of the centrifugal switch 34 is a solenoid 46 associated with a field contactor FC for closing the field contactor switch 48. This applies the constant potential from source 38, as separate excitation, to the generator shunt field winding 50 for developing a shunt field that is opposed in direction to the series field, as indicated by the diamond tipped arrow 52. In series with shunt field 50 is a resistance, preferably a variable resistance, such as rheostat 54, for controlling the amount of current from the constant potential source 38 that is allowed to traverse shunt field 50. In other words, the amount of separate generator excitation is controlled by rheostat 54, the greater the amount of resistance in series with winding 50 the less the shunt field developed, and vice versa.

Also in series with the generator shunt field winding 50 is a forward-reverse contactor system indicated generally by block diagram 56. This forward-reverse system, in reality, would preferably include two pairs of contactors or switches with each pair being mutually exclusively operable to cause current to traverse the shunt winding 50 in one direction whereby the generator output voltage is of one polarity for a forward movement of the vehicle, and in the opposite direction for the other polarity to effect a reverse movement thereof. This of course means that the forward-reverse system 56 would be actually connected to winding 50 on both sides thereof. To cause the forward pair of switches to be operated, a lever 58 is moved by the vehicle operator to the "F" position, and for reverse to the "R" position. This lever is connected to the forward-reverse system 56, as indicated by dash line 60. Dash line 62 diagrammatically indicates that the speed of shaft 26 operates a centrifugal switch or governor so that both the forward and reverse pairs of switches are mechanically interlocked to an "off" position at idling engine speeds. Such an interlock is preferable from a safety standpoint as double insurance, though not absolutely necessary since below the predetermined speed determined by centrifugal switch 32, neither the generator armature nor shunt field circuits is operative because contactor switches 40 and 48 are then open.

More than one generator may be used, either in a series or parallel connection, as desired. In any event, the maximum generator output as caused by the highest engine speed and zero field rheostat resistance does not cause operation of the generator above the knee of its saturation curve but generator design is such as to keep operation below the knee. The differential compounding of the generator prevents overloading and stalling of the engine by limiting the generator power output to within safe limits of the horsepower rating of the engine.

The armature circuit of generator 30 is serially coupled by line 64 to each of the motors 66 and 68, causing their respective armatures 70 and 72 to be in parallel. These armatures are mechanically coupled to wheels 16 and 18, through respective gear reducers 74 if desired. These motors have respective shunt field windings 76 and 78, which are respectively serially connected to field balancing resistors or rheostats 80, 82 in parallel with each other and serially with a shunt field resistor, preferably of the variable resistance type, such as rheostat 84. The movable element of this rheostat is connected as illustrated to the constant potential source 38, providing a separate, constant excitation potential for each of the motors 66, 68.

In addition, each of the motors 66 and 68 develops a series field which is in effect the combination of two fields respectively developed by split and crossed sets of field windings. For example, the series field for armature 70 is developed by the two fields produced by series windings 86 and 88 associated with armature 70. Instead of both of these windings being serially connected to the same armature, one is connected to armature 70 of one motor and the other to armature 72 of the other motor. In like manner, motor 68 has its two series field windings 90 and 92 respectively serially connected with the series windings 86 and 88 of motor 66. As indicated by the diamond tipped arrows 94 and 96 on the respective pairs of series field windings, the fields of each winding in a pair are additive, and as further indicated by the diamond tipped arrows 98 and 100 for the respective shunt fields, the series fields for each motor are cumulative with the shunt field of that motor. These cumulatively compounded split and crossed field motors automatically compensate because of such connections for any unbalanced loading condition on the motors in addition to the inherent droop necessary when turning corners. In operation, for example if the rear wheels have their respective loads changed because the vehicle is turning a corner, say, wheel 16 tends to slip, this, in turn, would increase the speed of armature 70 causing a larger counter E.M.F. to be developed, thereby decreasing the armature current through series winding 86 and series winding 90 associated with the other motor. This decreased current through winding 90 would cause a weakened field for motor 68, so its counter E.M.F. is reduced, thereby increasing its armature current, which traverses not only the respective series field winding 92, but also the series winding 88 to effect an enlarged field for motor 66. Such an increase in field causes the speed of armature 70 to be reduced and its torque increased, thereby eliminating or at least limiting the slippage of wheel 16.

The proportion of split between the series windings on the motors may be as desired for the type vehicle at hand, for example windings 86 and 88 may both supply about 50% of the series field though the ratio may be considerably changed as required.

It is necessary in accordance with this invention that the potential from source 38 be kept constant in order that the shunt fields can be properly controlled. Source 38 may comprise any conventional equipment for maintaining a constant potential, for example a battery or batteries with a close regulator and recharger, or a G.E. type thyrite rotary generator, or any regulated constant potential source.

Though generator field resistance 54 and motor field resistance 84 are illustrated as of the rheostat type, they may be fixed resistances of value predetermined to set the generator and motor shunt fields at desired operating points to cause the preferred speed torque characteristic desired for the drive system. Alternatively, knobs or the like for controlling the movable arms of rheostats 54 and 84 may be disposed near the dashboard of the vehicle for manual adjustment of the shunt fields by the vehicle operator. Still further, these rheostats, or desired set or sets of resistances utilized instead, may be switched in and out automatically by relays or the like operating off the manifold vacuum 24, as diagrammatically indicated by dash lines 102, 104.

In any event, the motor and generator shunt fields may be varied to adjust the speed torque characteristic of the drive system to the load requirements. To start the vehicle, when maximum torque is required, maximum motor field is effected by reducing the resistance of rheostat 84 or its equivalent to zero. At the same time, the output voltage from generator 30 as applied across the armature circuits of the motors is reduced to the minimum determined by the speed of engine 20 while the resistance of rheostat 54 or its equivalent is at maximum causing the generator field to be minimum. At the other extreme for example, i.e., at a relatively high vehicle speed, motor torque may be minimized by minimizing motor fields with maximum resistance in rheostat 84, while motor speed is maximized by maximizing the generator shunt field with minimum resistance in rheostat 54 to cause a maximum generator output voltage, and at the same time the engine speed may be reduced via the foot accelerator without lowering vehicle speed. It is important to notice that the engine speed, as the speed of the vehicle increases, need not rise proportionally in accordance with this invention, and as a consequence the overall capacity of the engine can be considerably less as compared to present vehicle engines for the same load requirements, since in this drive system engine drag is minimized. That is, at high vehicle speed, the unneeded power is not present as it is in conventional drives wherein it is still necessary to "drag" the pistons at high speed to get the high vehicle speed desired, because of the direct mechanical connection from engine to wheels. In the present invention, maximum horsepower is constantly available and is used as required without loss due to unneeded engine speed.

Thus, it is apparent there is provided by this invention a system and apparatus which will provide for the objects and advantages herein indicated. After reading this disclosure, one of ordinary skill in the art will appreciate many modifications of the invention can be made, but it is to be understood that the invention is not limited by the above exemplary disclosure but by the appended claims.

What is claimed is:

1. A power drive system for driving variable loads in response to an engine the speed of which is variable, comprising at least one differentially compound generator connectable to be driven by said engine at any desired engine speed and above and including means for maintaining a protective maximum horsepower characteristic for preventing engine overload and stall, two compound motors having their armature circuits in parallel with each other and in series with the armature circuit of said generator for driving said loads respectively, constant potential source means, and means, including speed and torque control resistances connected between said source means and, respectively, the generator shunt field winding and a parallel connection of the motor shunt field windings, for adjusting the speed torque characteristic of the drive system in accordance with the load requirements on said motors to allow for maximum starting torque at a speed determined by said engine and minimum torque at a motor speed high relative then to the engine speed and as then determined by the said speed control resistance.

2. A system as in claim 1 for use with said engine as aforesaid, of the type which has a manifold vacuum system, said drive system including in said adjusting means, means responsive to the pressure in said vacuum system for automatically controlling the value of said speed and torque control resistances.

3. A system as in claim 1 wherein each of said motors is cumulative compound and has two separate series windings that are cumulative wound relative to each other but cross connected between motors.

4. In combination with a vehicle having a variable speed engine and at least two wheels to be driven, a D.C. generator having an armature, a shunt field winding, and a differentially wound series field winding, means for rotating said armature in accordance with the speed of said engine to develop a generator armature current and output voltage proportional to said engine speed, constant potential source means, means including a rheostat connecting said shunt field winding to said source means to effect a controllable separately-excited generator shunt field for controlling said output voltage in proportion thereto also, means serially interconnecting said armature and series field winding for effecting in response to said armature current a series field which opposes said shunt field to maintain a protective maximum horsepower characteristic and prevent engine overload and stall, two D.C. motors respectively coupled to said vehicle wheels, each said motor having a respective armature, shunt field winding, and two series field windings cumulatively wound relative to each other and to said shunt field winding, means including a second rheostat connected between said source means and motor shunt field windings to effect controllable separately-excited motor shunt fields for controlling the torque of said motors in unison, means serially connecting said generator series winding to each of said motor armatures to cause the motor armatures to rotate at a speed proportional to said generator output voltage, and means serially connecting each motor armature with one of its own series field windings and with a series field winding from the other motor to cause the two series fields of each motor to be cumulative with the shunt field of that motor for causing compensation by the motors of an unbalanced loading condition on the motors.

5. In combination: a vehicle having a combustion engine including a vacuum system the pressure of which varies according to engine loading, means for varying the operating speed of said engine, and at least two wheels to be driven; and an electrical drive system including at least one D.C. generator having an armature circuit including a differentially wound series field winding and a separate shunt field winding, means for rotating said armature in accordance with the speed of said engine to develop a generator armature current and output voltage proportional to said engine speed, constant potential source means, speed responsive switch means operable to close a circuit upon attainment by said engine of a predetermined speed, first contactor means in circuit with said switch and said source means for closing said armature circuit when said predetermined speed is attained, means including a first rheostat connectable between said shunt field winding and said source means to effect a controllable separately-excited generator shunt field for controlling said output voltage in proportion thereto also, said series field winding being effective in response to said armature current to cause a series field which opposes said shunt field to maintain a protective maximum horsepower characteristic and prevent engine overload and stall, two D.C. compound motors respectively coupled to said wheels, each said motor having a respective armature, shunt field winding, and two cumulative wound series field windings, means including a second rheostat connectable between said source means and motor shunt field windings to effect controllable separately-excited motor shunt fields for controlling the torque of said motors in unison, a second contactor in parallel with said first contactor for connecting and disconnecting said first and second rheostats to and from said source means respectively above and below said predetermined engine speed, means serially connecting said generator series winding to each of said motor armatures to cause the motor armatures and consequently said wheels to rotate at a speed proportional to said generator output voltage, means serially connecting each motor armature with one of its own series field windings and with a series field winding from the other motor to cause the two series fields of each motor to be cumulative with the shunt field of that motor for causing compensation by the motors of any unbalanced loading condition on the motors, and means including the said first and second rheostats operated in response to said vacuum system pressure for adjusting the speed torque characteristic of said motors in accordance with the load requirements on said motors to allow for maximum starting torque at a speed determined by said engine under minimum generator field conditions and to allow for minimum torque with maximum generator field conditions providing a motor speed which is high relative to the then required engine speed.

6. A combination as in claim 5 including means coupled to said generator shunt winding for changing the polarity of said generator output voltage to cause said motors and their respective wheels, and consequently said vehicle, to move in either a forward or reverse direction.

References Cited by the Examiner
UNITED STATES PATENTS

| 1,730,786 | 10/29 | Rosenthal | 290—17 |
| 1,745,130 | 1/30 | Turner | 290—17 |
| 1,803,676 | 5/31 | Powell. | |
| 1,946,293 | 2/34 | Rosenthal. | |
| 1,976,525 | 10/34 | Storer | 318—52 |
| 2,600,897 | 6/52 | Mathias | 180—65 X |

A. HARRY LEVY, *Primary Examiner.*